United States Patent [19]
DeMichiel et al.

[11] Patent Number: 5,857,182
[45] Date of Patent: Jan. 5, 1999

[54] DATABASE MANAGEMENT SYSTEM, METHOD AND PROGRAM FOR SUPPORTING THE MUTATION OF A COMPOSITE OBJECT WITHOUT READ/WRITE AND WRITE/WRITE CONFLICTS

[75] Inventors: Linda Gail DeMichiel, Los Altos; Gene Y. C. Fuh, San Jose; Michelle Mei-Chiou Jou, San Jose; Bruce Gilbert Lindsay, San Jose; Nelson Mendonca Mattos, San Jose; Serge Philippe Rielau, San Jose; Brian Thinh-Vinh Tran, San Jose, all of Calif.

[73] Assignee: International Business Machines Corporation, Armonk, N.Y.

[21] Appl. No.: 786,605

[22] Filed: Jan. 21, 1997

[51] Int. Cl.$^6$ ........................................................ G06F 17/30
[52] U.S. Cl. .......................... 707/3; 707/1; 707/2; 707/4; 707/5; 707/6; 707/7; 707/8
[58] Field of Search ..................................... 707/1, 2, 3, 4, 707/5, 6, 7, 8; 345/342; 395/682; 524/376

[56] References Cited

U.S. PATENT DOCUMENTS

| 5,546,576 | 8/1996 | Cochrane et al. | 707/2 |
| 5,689,665 | 11/1997 | Mitsui et al. | 345/342 |
| 5,765,039 | 6/1998 | Johnson | 395/682 |

OTHER PUBLICATIONS

A Comparison of Candidate Object Models for Object Query Services: pp. 1–5; http://www.nctu.edu.tw/~gis8551/compareOM.html//SQL.3Object Model, Jun. 1998.
A Function rewrite of SQL3, p. 1:http://www.csd.abdn.ac.uk/~pgray/fdmwkshop/theme6.html, Jun. 1998.

*Primary Examiner*—Thomas G. Black
*Assistant Examiner*—Diane D. Mizrahi
*Attorney, Agent, or Firm*—Marilyn Smith Dawkins

[57] ABSTRACT

The system, method, and program of this invention avoids potential write/write conflicts and read/write conflicts when a subcomponent of a composite object (e.g., an ADT) is mutated. The embodiments of this invention define a copy semantic for the mutation function. In one embodiment, a copy function is inserted prior to any mutation function. In a another embodiment, a global compile-time analysis is performed to determine if a write/write or read/write conflict exists; and to eliminate redundant copy constructors if a conflict does exist. In a preferred embodiment, only a local analysis is performed during the parsing phase, thereby avoiding a global compile-time analysis. A mutation safe flag is associated with each parse tree node. A read target leaf parse tree node is set to false while non-leaf parse tree nodes (functions) derive their value from an incoming node, except that constructors and copy constructor functions are always true. Whether or not a copy is made of the composite object (i.e., whether or not a copy constructor is inserted) prior to a mutation is determined according to the setting of the mutation safe flags and according to the following. If a mutation safe flag for a mutation function is false, a copy constructor is inserted for the mutated composite object and the mutation safe flag is set to true. In addition, for update and trigger statements, the mutation safe flag for a mutated target is defaulted to true. Furthermore, related update entries are grouped together and a copy is generated for the common target. The generated copy is used as the common target for all of the mutations caused by the update entries grouped together in order to accumulate all of the desired mutations in a same copy of the composite object.

31 Claims, 6 Drawing Sheets

135 — ASSOCIATE A NEW FLAG, "MUTATION_SAFE", WITH EACH "LEAF" PARSE-TREE NODE:

FOR ADT READ TARGET: DEFAULTED TO FALSE — 136

FOR ADT MUTATED TARGET: DEFAULTED TO TRUE — 137

THE "MUTATION_SAFE" FLAG FOR A NON-LEAF PARSE-TREE NODE IS DERIVED FROM THE INCOMING NODES AS FOLLOWS:   — 139

141 — CONTRUCTORS: ALWAYS TRUE

142 — COPY CONSTRUCTORS: ALWAYS TRUE

143 — OBSERVERS: INHERIT FROM THE PARSE-TREE NODE OF THE OBSERVED ADT

144 — MUTATORS:

IF MUTATION_FLAG(MUTATED ADT) = FALSE

INSERT A COPY CONSTRUCTOR FOR THE MUTATED ADT.

MUTATION_FLAG(MUTATOR NODE) = TRUE

*FIG. 1B*     103

DATABASE MANAGEMENT SYSTEM, METHOD AND PROGRAM FOR SUPPORTING THE MUTATION OF A COMPOSITE OBJECT WITHOUT READ/WRITE AND WRITE/WRITE CONFLICTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to database management systems that can handle composite objects, e.g., Abstract Data Types (ADTs), for complex data objects, and more specifically where attributes of the composite objects can be changed in queries, trigger statements, insert statements, and update statements by a mutator function in a syntactical environment such as SQL3 where an order of processing can not create different results.

2. Description of the Related Art

Databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives for semi-permanent storage.

A DBMS is structured to accept commands to store, retrieve, update, and delete data. One widely used and well known set of commands is called the Structured Query Language (SQL). The current SQL standard is known informally as SQL/92. A new proposed standard is referred to as SQL3. Tables of a relational database management system are created by means of a Data Definition Language (DDL), and the tables are manipulated by means of a Data Manipulation Language (DML). Both of these languages are defined in the SQL standards. The definitions for SQL also provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. The DBMS will optimize the method used to find the data requested in a query in order to minimize the computer time used and, therefore, the cost of doing the query.

In object-oriented databases (OODB), the database is organized into objects having members that can be pointers to other objects. An object can have parent-child hierarchical relationships. The objects contain references, and collections of references, to other objects in the database, thus leading to databases with complex nested structures.

The integration of object technology and database systems has been an active area of research for the past decade. One area of research has included extending relational database systems to handle data in an object-oriented fashion. It should be noted that SQL has object-relational queries; and IBM, Oracle, Informix and Illustra relational database systems have object oriented features in them.

Along this area of technology enhancements, SQL3 has proposed use of an abstract data type referred to as an ADT. The ADT is a feature of the next generation of object-relational databases. The purpose of introducing abstract data types is to deploy a structure type in order to model complex data easily.

An abstract data type (ADT) is a general mechanism supported by a database engine to model any kind of complex object in an object-relational DBMS. In more general terms an ADT is a type of "composite" object for handling complex data objects. The term "composite" object is used herein to mean an object having subcomponents wherein each subcomponent can be separately changed (i.e., mutated, etc.). Other kinds of SQL types of mechanisms that are also composite objects include arrays, lists, multi-sets, etc. A composite object can handle an infinite number of different kinds of complex objects including, but not limited to, multi-media objects, geographical data, time-series data, web data (e.g., URL documents), etc.

Many applications such as multimedia extenders, spatial extenders, and time-series extenders can be implemented using the ADT facility. An extender is an application that is built on top of a database server. An end-user or application developer does not have to worry about all of the details of the language features in a database supported by the database engine. The extender provides another interface outside of the database engine. An extender is also referred to as a data blade or cartridge.

For example, a multi-media extender can store images, audio, and video in a database. In addition to the object itself being stored, many other attributes associated with the object including format, title, caption, duration, color, actresses, actors, etc., can also be stored in the database. This type of object may be modeled by a time structured mechanism. Time may be important because different types of video formats will determine different ways to express the duration in time of a video. For example, the time interval of each sampling and the number of samples can determine the length of the video.

As other examples, a spatial extender is capable of storing geographical data or location data which could have mapped or coordinated data, including a reference system. A Time-series extender is capable of storing a series of data which is associated with time information. For example, this type of complex object can be used for financial applications such as for storing the value of stocks over a time interval showing a history of the stock.

It should be noted that although the problem that the invention herein overcomes is being explained in terms of an ADT, the problem is also associated with other types of SQL mechanisms including array type, list, multi-sets, etc. Again, all of these meet the definition herein of composite objects.

The usage of ADT is shown through the following example. A CREATE ADT statement in a data definition language (DDL) is shown to create an ADT type called "mediatype" that has seven attributes. For each attribute the first component is an attribute name and the second component is a type name.

```
CREATE ADT mediaType( title varchar(30),
                     description varchar(256),
                     rated char(4),
```

```
                    type char(1),
                    format char(4),
                    duration float,
                    content BLOB(1M));
```

The first attribute has an attribute name of "title" and a type name of "varchar(30)". The "title" attribute is the actual title of the work; the "description" attribute is an abstract or summary which describes the contents of the object; the "rated" attribute is the rating of the work such as "C", "PG", "R", etc.; the "type" attribute indicates whether it is audio, video, or image; the "format" attribute indicates the type of format, e.g., if the type attribute is an image, the format attribute indicates whether it is "mpeg", "gif", or "postscript"; the "duration" attribute indicates the length of time of the work; and the "content" attribute contains the complete content of the work whether it be video, image, audio, etc. The type name for the "content" attribute is "BLOB", i.e., a binary large object type.

```
CREATE TABLE mediaTbl(  name varchar(20),
                        publisher varchar(40),
                        unit_price float,
                        rental_price float,
                        media mediaType);
```

In the above CREATE table statement, the media table has 5 columns or attributes including name, publisher, unit price, rental price and media. The "media" attribute has a type name of "mediatype" which is the ADT created above. The "mediatype" column encapsulates all of the attributes of the ADT.

When the ADT is created or defined, the database engine not only creates a new type called mediatype, but it also creates a set of methods to manipulate the ADT object. These methods are compiler generated. The following is a minimal set of methods needed to manipulate a mediaType ADT. It should be noted that this minimal set is being used to describe the problem and to later describe the invention. It should be noted that the problem described herein, and the invention later described, are not limited to just these methods; especially since, over time, new methods may be introduced into the SQL standard which may be just as applicable. Basically, any method that acts upon a composite object is applicable.

Constructor: mediaType()->mediaType

Copy constructor: copy(mediaType)->mediaType

Observers: title(mediaType)->varchar(30), . . .

Mutators: content(mediaType, blob(1M))->mediaType,

The first category of methods is called "constructor". The name of the constructor is the name of the ADT. A constructor creates an ADT with attributes that are set to a default value, e.g., NULL. A second category of methods is called "copy constructor". The name is "copy" and it takes as input the ADT and returns another copy of the ADT object as output. There is one "constructor" and one "copy constructor" per ADT. A third category is called "observer". There is one observer method for each attribute. For example, for the title attribute, there is an observer method called title; and it takes the ADT as input and returns the attribute value as a result. In this example, it is of type varchar(30). Essentially, an observer is a partial read since it reads only a specific attribute of the ADT and not the whole ADT object. The mutator method updates the value of attributes. For example, for the attribute content, the ADT is taken as input and whatever new value for that attribute is the second argument. It mutates that attribute with the new value and returns the mutated object as the result. The mutator method is essentially a partial write since it only updates an attribute within the ADT. The above minimal set of methods are automatically generated by the compiler when the ADT is created. For the above example, the compiler would have generated one constructor, one copy constructor, seven observers, and seven mutators.

The syntax of how these methods can be invoked is as follows. The methods are actually user-defined functions. The methods can be used in any kind of context that a user-defined function can be used. As shown below, the function notation is shown on the right hand side of the "=" sign. For example, "title(media)" means that one wants to get the title attribute value out of the corresponding media; "copy(media)" makes a copy of the input; and "rated(media, 'PG13')" is a mutator function which takes the media as input and mutates the rated attribute value with "PG13".

| Double-Dot Notation | | Function Notation |
|---|---|---|
| media..title | = | title(media) |
| media..copy | = | copy(media) |
| media..rated('PG13') | = | rated(media, 'PG13') |
| SET media..rated = PG | = | SET media = rated(media, 'PG') |

As shown above, the ADT methods above can be invoked through function notation. Also shown above is an equivalent double-dot notation for each of the above methods. The double-dot notation reflects an object-oriented approach for implementing the methods. Nevertheless, the internal semantics are equivalent whether the function notation or the double-dot notation is used. The double-dot notation for the mutator function for the example "media..rated ('PG13')" means that the object media is sent a rated message along with the argument 'PG13'. The message will tell the object to mutate itself with the new value.

The SET clause is currently used in two different contexts. One is in an update statement as follows:

Update tbl.T of SET media..rated=PG which means that the rated attribute of the media column of table T is to be updated with the value 'PG'. The second context where the SET clause is used is in triggers to update transition variables and transition tables. Regardless of the context used, when the double-dot notation is used on the left hand side of the equality sign in a SET clause, it actually means a mutation function.

It should be noted that the above double-dot notation is not limited to ADTs. It is proposed in the SQL3 standard that the double dot notation can be used in a more general way for general function invocation. For example, 3..smallint is equivalent to smallint (3).

Since double-dot notation and function notation are equivalent, they can be used interchangeably as in the following examples:

```
UPDATE mediaT SET
    media..rated = 'PG'
    media..title = 'Snow White'
    media..description = media..title || media..description;
``` is equivalent to

```
UPDATE mediaT SET
    media = description(title(rated(media, 'PG'),
                              'Snow White',
                              title(media) || description(media));
```

The above two update statements are equivalent. The first uses double-dot notation which clearly states the purpose of the update statement. However, the second update statement uses function notation which may not be as clear as the previous double-dot notation because the second statement uses nested function invocation. The innermost nest is the mutation function for the rated attribute, rated(media, 'PG'), which takes the media input and mutates the rated attribute with 'PG', and returns a mutated object as output. Based on that mutated output, the title attribute is mutated with 'Snow White'. Then, the description attribute is mutated with the title attribute value and the description value attribute concatenated together as indicated by "||". Regardless of how the sequence of mutations are carried out, at the end of all of the mutations there should be a media object with the designated attributes mutated accordingly, i.e., the media object should reflect an accumulated effect.

As can be seen from the above example, if there were ten attributes in an ADT, there would be ten levels of nested function invocation. Essentially, using function notation to mutate an ADT requires mutating the ADT in a nested fashion.

The following examples show ways to use the methods described above using data manipulation language (DML).

```
INSERT INTO mediaTbl values  ('Family film #1',
                              'Walt Disney, Inc.'
                              19.99,
                              2.5,
                              mediaType( ) );
UPDATE mediaTbl SET
    media = title(rated(description(...content(media, :hv), ...
                                    'A story in Africa...'),
                         'PG13')
                  'Lion King');
UPDATE mediaTbl SET
    media..title = 'Lion King',
    media..rated = 'PG13',
    media..description = 'A story in Africa ...',
    ...
    media..content = :hv;
SELECT publisher, unit_price, media..title, media..description
FROM mediaTbl
WHERE media..type = 'VIDEO' AND media..rated ='PG13'
      AND media..duration < 100;
```

As shown above, an ADT value can be inserted into a table. In the above example, an "empty" object (with all its attributes set to default values) is inserted for the ADT. The UPDATE statement populates the ADT column using a nested function invocation. In the innermost label, . . . content(media, :hv), "media" is referenced which maintains the content of the media column with whatever is represented by the host variable. The result of the mutation is a mutated ADT. The other attributes are mutated through a nested function invocation: the description attribute is mutated with 'A story in Africa . . . '; the rated attribute is mutated with 'PG13'; and the title attribute is mutated with 'Lion King'.

The third example above is an equivalent UPDATE statement using double-dot notation.

The last example above is a query. After a table is populated through the above UPDATE statement, one can use a SELECT statement as shown above to find attributes-e.g., publisher, unit_price, title, description-from the media table that meet the criteria in the WHERE clause.

ADT mutators update attribute values in place. That is, the ADT compound structure object is only updated in parts, i.e., the whole object is not updated, only the applicable part of the object is modified, in effect performing piecemeal mutation. ADT mutators are needed to construct ADT values. This is done by using INSERT and UPDATE statements as shown above.

The SQL language is declarative. This means that the order of evaluation selected by the optimizer should not affect the result of the query. For example, if there are multiple items in a select list, for example, SELECT expression1, expression2 FROM table T, it should not matter whether expression1 or expression2 is evaluated first. Likewise, for conjuncts in a WHERE clause having predicate 1 AND predicate 2, it should not matter which predicate is evaluated first. The same should hold true for SET clauses in an UPDATE statement for SQL2 where there are no provisions for ADTs, and as provided otherwise herein for SQL3 which supports ADTs.

Before describing the problem which the invention herein addresses, it should be noted that it is believed that the problem itself has not been previously discerned.

The problem that is being identified and solved by this invention is as follows. Although a mutation is needed to construct an ADT, it will create a side effect that makes the order of evaluation significant. As such, the mutation of an ADT will cause an anomaly in the context of the declarative SQL language. The order of evaluation will indeed matter. This will create a Read/Write conflict and a Write/Write conflict.

An example of a Read/Write conflict is as follows:

```
SELECT for_children(media..rated, media..duration),
       rated(media, :hv)
FROM mediaTbl
Where publisher = 'Walt Disney, Inc.';
```

In the select-list of the SELECT statement the rated attribute of the media column is referenced and a function, for_children, is applied to it. In the second select-list item the rated attribute of the media column is mutated with a new value represented by a host variable. Depending on the order of evaluation, the value of the first rated attribute will be either the updated value (if the second select list item is evaluated first since it will reflect a mutated value), or it will be a previous value prior to being mutated (if the first select-item is evaluated first). Consequently, the function 'rated' in the second select item has side affects because its purpose is to perform a mutation. This is contrary to SQL being a declarative language since there should be no effect on the order of evaluation. The SQL language does not even differentiate on the order that the SELECT statement is written. For example, writing the above statement as:

```
SELECT rated(media, :hv)
       for_children (media..rated, media..duration)
FROM mediaTbl
Where publisher = 'Walt Disney, Inc.';
``` should have no effect on the values returned since the order of evaluation is not determinative on the order in which lists in statements are written. (It should be noted that the query compiler will give the answers in the order specified; so the values themselves will be the same although the order presented to the user will be different.) Internally, the query optimizer will determine the best access plan to evaluate the SELECT statement. The query optimizer should not be concerned with the order of evaluation.

The following UPDATE statement also illustrates a Read/Write conflict:

```
UPDATE mediaTbl SET
   media..title = :hv,
   media..description = media..title || media description;
```

In the second line of the UPDATE statement, the title attribute of media is updated; and in the third line on the right hand side of the equality, the title attribute is read. Depending upon which item is evaluated first will determine the value that is read thereby creating different results.

An example of a Write/Write conflict is as follows:

```
SELECT rated(media, :hv1) FROM mediaTbl
   WHERE publisher = 'Walt Disney, Inc.' AND
      for_children(rated(media, :hv2)..rated,
                   media..duration)=1;
```

In the SELECT list, the media column is mutated by host variable1, hv1. In the WHERE clause there is another mutation function to mutate the media column by host variable2, hv2. There are two mutations of the same rate attribute value of the media column in a single statement. However, according to the SQL language, it should not matter which function is evaluated first. The result should always be the same. The above illustrates that this is not the case, and thereby creates a problem because the principles of SQL language can not be adhered to. Since the mutation function "rated" has side affects, there is a conflict. Since both functions are writing, it is called a Write/Write conflict.

An example where there is no conflict is as follows:

```
UPDATE mediaTbl SET
   media..title = :hv,
   media..rated = 'PG13';
```

The media table is updated at two different attribute values. There is no write/write conflict or read/write conflict.

SUMMARY OF THE INVENTION

It is therefore an object of this invention to solve the problem identified herein by allowing attributes of composite objects to be mutated and to avoid write/write or read/write conflicts.

It is a further object of this invention to provide an implementation of a solution to the above described problem which minimizes the run-time processing.

It is a further object of this invention to provide an implementation of a solution to the above described problem which minimizes any additional processing required at compile-time.

Abstract Data Types (ADT) for handling complex data objects in relational systems have been previously proposed in the SQL3 standard. However, a problem is now discovered that there is a mutation anomaly in the context of the SQL language. This mutation anomaly is also associated with other SQL mechanism types such as an array type, list, and multi-sets. In other words, a problem can occur whenever the subcomponents of a composite object can be individually changed, i.e., mutated. That is, mutating a composite object in a query or an update statement can cause different results depending upon the processing order of the query statement or update statement. However, the SQL language dictates that the processing order should have no effect.

The system, method, and program of this invention is described in terms of three embodiments for separately mutating attributes of a composite object. All of the embodiments depend upon a copy semantic that is needed to solve the problems identified herein as write/write conflicts and read/write conflicts when a composite object is being mutated in an SQL environment where the order of processing cannot affect the results. A first embodiment routinely inserts a copy constructor for every mutation of the composite object, e.g., an ADT. The mutator function will use a copy of the composite object and all other functions will use the original composite object. A second embodiment performs a global compile-time analysis in order to eliminate redundant copy constructors. Essentially, if different attributes of a same copy are being mutated, the copy constructor for each different attribute can be eliminated. At most, only one copy constructor may be needed for the innermost mutation. In addition, if the global analysis determines that the SQL statement only contains a mutation function on the object, and there is no observer function, then no copy at all would be needed. However, such a global-compile time analysis is needed to determine whether an observer function is present somewhere within the SQL statement.

The third, and preferred, embodiment further solves implementation problems associated with the first and second embodiments. Most importantly, the number of copies made for composite objects at run-time is reduced, thereby minimizing the run-time processing. In addition, this reduction in the number of copies needed is achieved without performing a global compile-time analysis, thereby minimizing the additional compile-time processing that is required.

For the preferred embodiment, update targets, mutate targets and read targets are introduced. The concepts of an update target and read target are in SQL2. Essentially, an update target is the left-hand side of a SET clause, i.e., the object that is desired to be updated. The read target is a column reference on the right-hand side of the equal sign in a SET clause. The read target refers to the whole composite object and not just to a component. Essentially, everything that is initially on the right-hand side of the expression is a read target, even if the object is being mutated. A mutate target, also referred to herein as a common target, is introduced for updates of composite objects so that side effects can be accumulated. The mutate target, which is generated and inserted by the compiler, has two properties. The first property is that the same copy of the mutate object on the right hand side of the equality has to be shared in order to accumulate all of the mutated effects in a same copy. The second property is that the copy for the mutate target cannot be the same copy for the read target. This will avoid a read/write conflict. Because of this, read targets and mutate targets are distinguished on the right-hand side of an equality in a SET statement. As a result, when a mutate target is generated by the compiler, it inserts a new copy for the corresponding column (ADT) that is being mutated, (the original one for the read target and a new copy for the mutate target to accumulate the side effect), and a mutation_safe flag is set to true.

In implementing a preferred embodiment of the invention, the query parser will parse leaf and non-leaf nodes of an incoming query statement. A leaf node is associated with atomic types such as literals, columns, host variables, etc. An intermediate node, or non-leaf node corresponds to function invocations such as constructors, mutators, observers, etc. For example, for the expression "A+B", "A" and "B" would be leaf nodes and "+" would be a non-leaf node.

The preferred embodiment implements the following two steps. First, a mutation_safe flag is associated with each parse-tree node. For each "leaf" parse-tree node, the mutation_safe flag for an ADT read target is defaulted to false and the mutation_safe flag for an ADT mutated target is defaulted to true. The mutation_safe flag for a non-leaf parse-tree node is derived from the incoming nodes as follows. The mutation_safe flag for constructors and copy constructors is always true. The value of the mutation_safe flag for an observer will be inherited from the parse-tree node of the observed ADT. For a mutator, if the mutation_safe flag is false, a copy constructor is inserted for the mutated ADT, and the resulting mutation_safe flag is set to true. This first step of the algorithm is used to determine where to insert a copy.

The second step of the preferred embodiment takes place only for an update or trigger statement. This second step enables an accumulation of mutated attributes in a same copy of a composite object. In this step, the update entries are grouped together by the update target. A built in function "prog1" is used for each attribute being updated. A copy of the updated column is also created by the compiler and used as the common target of the mutations caused by the update entries that belong to the same group. For each "prog1" function, the first argument of the function will be returned as the result, and the second argument of the function obtains the side effect caused by the mutation. The sequence of "prog1" functions are nested together which accumulates the mutation side effects. The necessary copy constructors will be inserted according to the above rules for assigning values to the mutation safe flag and for inserting a copy constructor if the mutation flag is false.

As such, the system, method and program of this invention inserts a minimum number of copy constructors into the expression. Thus, at run-time, a minimum number of copies of composite objects are made. In addition, for SET clauses in update and trigger statements, the desired effect of accumulating the mutations into a single copy of a composite object is achieved.

BRIEF DESCRIPTION OF THE DRAWING

For a more complete understanding of this invention, reference is now made to the following detailed description of the embodiments as illustrated in the accompanying drawing, wherein:

FIG. 1B illustrates the rules for setting a mutation_safe flag for leaf and non-leaf nodes of a parse-tree;

```
SET  C..title      = C..title || '(directors cut)'
     C..rated      = 'PG13',
     C..content    = C..content || :new_ending.
```

DETAILED DESCRIPTION OF THE PREFERRED EMBODIMENTS

Although the following description of the embodiments of this invention are described with reference to ADTs, the invention is applicable to any kind of composite object that has subcomponents that can be modified. For example there are other types of SQL mechanisms called array type, list, set, and multi-set. All of these are composite objects having subcomponents that can be individually changed.

The following embodiments of the invention for avoiding potential write/write and read/write conflicts when a composite object is mutated are illustrated with reference to FIGS. 1A and 1B.

Figure 1A:
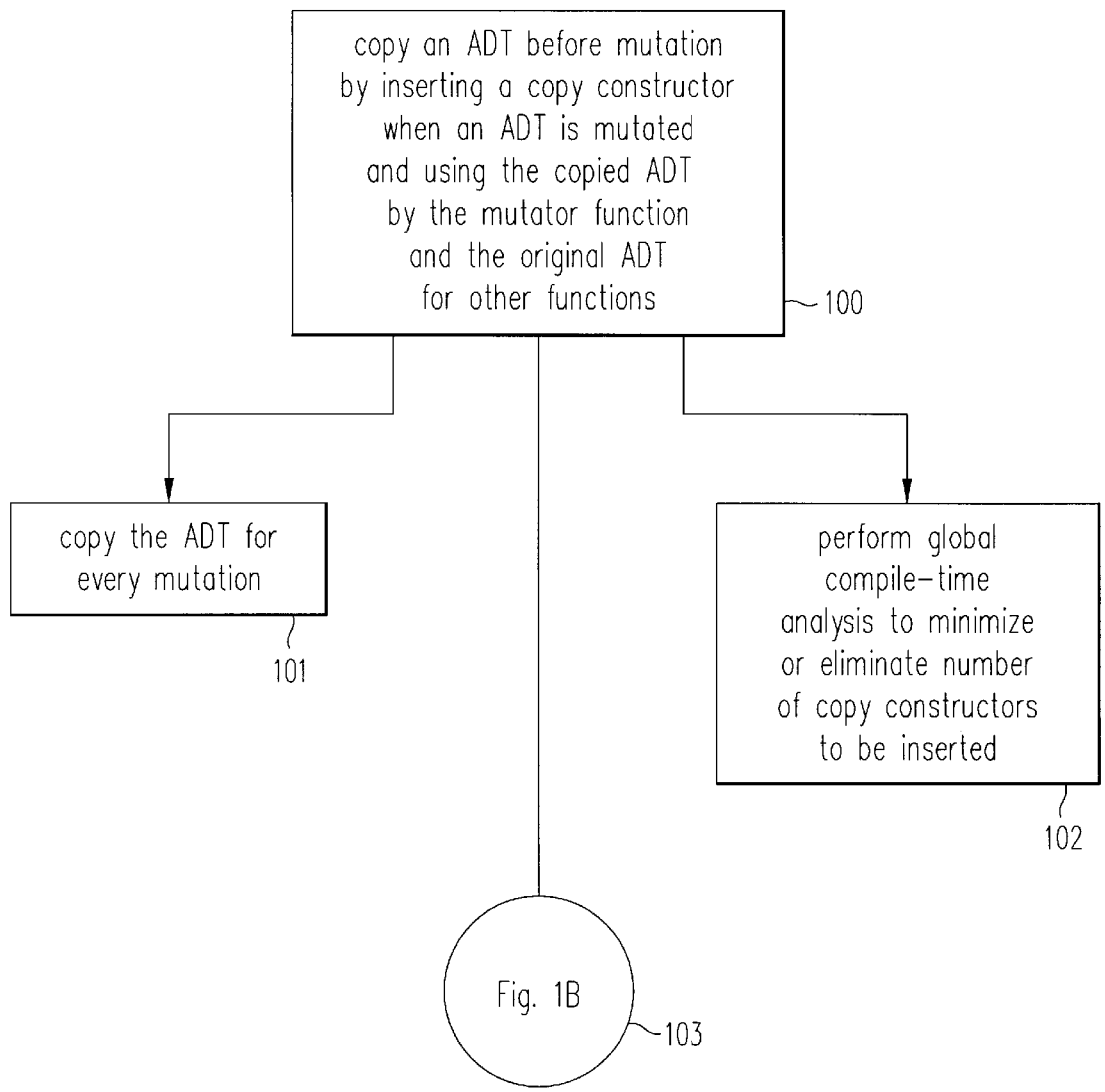
FIG. 1A illustrates several embodiments for copying an ADT before a mutation to avoid write/write and read/write conflicts when an ADT is being mutated.

The semantics that are needed to avoid such conflicts is to copy an ADT before mutating the ADT, 100, FIG. 1A. A copy constructor function is inserted when an ADT is mutated. The mutator function uses, i.e., mutates, the copied ADT and the other functions use the original ADT. As such, the concept of a mutation is based on copy semantics. This means that when an ADT is subject to a mutation function, it is copied or duplicated before it is mutated. A copy is made to avoid the write/write and read/write conflicts described previously. This results in a desired behavior and desired semantics of the mutation function. The system then can guarantee that the mutation function is evaluated and the output is a resulting ADT as expected while avoiding conflicts.

One embodiment copies an ADT before every mutation, 101 FIG. 1A. Although a system, method, and program which inserts copy constructors whenever an ADT is mutated solves the above-described problem, there is an adverse affect on performance. For example, if all of the "In" number of attributes of an ADT are going to be populated, then there may be "n" number of copy constructors for constructing an N-attribute ADT. The more attributes there are, the more copy constructors are inserted. The following shows an example of inserting copy constructors:

```
UPDATE mediaTbl SET
    media = title(
        copy(rated(
            copy(description(
                ...
                copy(content(copy(media), :hv),
                ...
                'A story in Africa...'),
                'PG13),
                'LionKing');
```

The copied ADT is fed to the mutator function, so that the original ADT is not mutated. The copied ADT is mutated, since the original "media" ADT may be used at another place in the same statement.

Another embodiment performs a global compile-time analysis to minimize the insertion of copy constructors, 102, FIG. 1A. The global compile-time analysis goes through the entire parse tree. For each ADT object appearing in the query statement, it accumulates all of the information as to which attributes are being mutated, where it is being mutated, which attributes are being observed, and where it is being observed. Once this information is complete, the compiler can conclude whether there is a write/write or read/write conflict. If there is no conflict, no copy will be inserted. For example, in the UPDATE statement above, there is a nested function call to mutate each attribute of the media column. After the global analysis, the compiler figures out that there is only one ADT object, and it is only being mutated successively. There are no other places where the media object is being mutated or observed, so there is no conflict and no copy needs to be inserted. However, this type of global analysis can be quite expensive because it has to examine each expression of the statement; and, it should be noted, a given statement may have many expressions. The compiler has to examine each expression and accumulate all of the information as to how many objects there are, what operations are performed on each object, e.g., observe, mutate, etc., and where the operations appear, e.g., in a same or different expression. Consequently, it can be a very pervasive type of analysis.

The previous example can be used to show a further aspect of this embodiment. Assume, for example that the global compile-time analysis determined that another expression contained an observer function invocation of the media object. Then, except for the innermost copy constructor, the remaining copy constructors are redundant. In the above example, only the innermost copy constructor is needed to be inserted. In the event the innermost copy is needed, and the ADT is copied, the successive mutation functions will mutate different attributes of the same copy. Therefore, other parts of the statement will not be affected. Consequently successive copy constructors can be eliminated if different attributes of the first copy are being mutated. However, it should be noted that even the innermost copy constructor may not be needed if the global compile-time analysis indicates that there is no observer function that will be reading the same attributes that are being mutated.

With only the innermost copy constructor inserted, the above statement would then appear as:

```
UPDATE mediaTbl SET
    media = title(
            (rated(
              (description(
                 ...
                 (content(copy(media), :hv),
                 ...
                 'A story in Africa...'),
                 'PG13'),
                 'Lion King');
```

A drawback to this approach is that a global compile-time analysis for determining and optimizing which copy constructors need to be inserted can be expensive to implement. Any such algorithm would be difficult to maintain because it would be sensitive to the syntax in the language. Consequently, the algorithm that carries out the compile-time analysis would have to be enhanced whenever new language constructs are introduced into the SQL language. Also, compiler analysis can be prone to error. The analysis may also cause more of a performance hit than having the redundant copy constructors.

A preferred embodiment, 103, FIGS. 1A and 1B, provides a simplified algorithm that gives optimal results for most of the practical scenarios. It is syntax directed which means that it does not require the global analysis, only a local analysis is sufficient.

Consider again, the following example:

```
UPDATE mediaT SET
    media = description(title(rated(media, 'PG'),
                              'Snow White',
                              title(media) || description(media));
    (regular font)   media: update target
    (italic font)    media: read target
```

As shown above, there are two kinds of 'media' being referenced. The first kind of 'media' references 'media' on the left hand side of the equality which represents the target to be updated. This is referred to as an update target. The second kind of reference to 'media' are the ones that are referenced on the right hand side of the equality. There are three references to this kind of 'media' in the above example. These references are read only, and thus are referred to as read-targets. The database engine will refer to the attribute value of media before an update. As shown above, there are two different meanings for 'media' in the functional nested notation depending upon where 'media' appears in the notation.

The database system's function, method and program is described below with reference to FIG. 1B.

When a parse tree is examined for an expression, the leaf node can be a column, a literal, a host variable, or special register, etc. The concern is when the leaf node is a column. Read and mutated references are distinguished. A read reference of a column is associated with a flag called "mutation-safe". The value of the flag is set to false, 136 FIG. 1B. This means that at this point of time, the reference is to an ADT. To be conservative, it is assumed not to be safe to mutate; or in order to mutate it later on, it has to have something done to it. For a mutated target, the default value of the flag is true, 137, FIG. 1B. (A mutated target is discussed further below with reference to update statements and trigger statements. As such, item 137 is used only when an update statement or trigger statement is being evaluated.) Consequently, every ADT column, i.e., every leaf parse tree node, is associated with a forced value mutation flag, 135 FIG. 1B.

When the parse tree is traversed, non-leaf nodes are handled as follows, 139 FIG. 1B. The only concern is with functions created for the ADT, e.g., constructors, copy constructors, observers and mutators. The other functions do not mutate an ADT, and therefore do not create the problem being solved by this invention. For constructors, the mutation_safe flag is set to true, 141, FIG. 1B. Because a brand new ADT is being created, the rest of the language of the statement cannot use this copy anyway because it has not been given a name binding. Likewise, a copy constructor has its mutation_safe flag set to true, 142. A fresh copy is created out of an existing ADT object. Again, since it is just being created, no other part of the statement can use this copy. Whatever is done to this object is safe. For observers, the mutation-safe flag value is inherited from the parse tree node of the observed ADT, 143. The input arguments of the observer are looked at to determine whether or not it is safe. In other words, the mutation safe status for an observer is the same as the input to the observer: if the input is safe then the observer is also safe; if the input is not safe, then the observer is also not safe.

For a mutator, the mutation flag of the ADT is examined. If it is false, then it is not safe to mutate. Since it is being mutated, a copy constructor is inserted for the mutated ADT to avoid a potential conflict. Regardless of whether it is false or true, the mutation_safe flag for the result of the mutator function is always set to true. If the incoming ADT was safe, then it is also safe. If the incoming ADT was not safe, it is safe now since a copy was inserted for it to avoid a read/write conflict, 144, FIG. 1B.

The above described function and algorithm is applied to the following UPDATE statement as follows:

```
UPDATE mediaTblSET
    media = title(
            (rated(
                (description(
                    ...
                    (content(copy(media), :hv),
                    ...
                    'A story in Africa ...'),
                "PG13'),
            'Lion King');
```

Starting at the innermost leaf node, the media column, is a leaf node and it is a read target. According to the algorithm, the mutation_safe flag associated with it will be set to false indicating that it is unsafe. Propagating outward to the function "content", it is a mutation function, and, therefore, a non-leaf node. For non-leaf nodes, the mutation_safe flag is derived from the incoming nodes. Since the incoming ADT (i.e., the media read target) is not safe, the mutation_safe flag for the mutation function "content" is also set to false. When a mutation_safe flag of a mutated ADT is false, a copy constructor is inserted for the mutated ADT, and the mutation_safe flag of the mutator node is set to true. Therefore, a copy constructor function is inserted as shown above, and the result of the content function invocation is safe. Applying the algorithm again, a successive copy constructor does not need to be inserted for successive mutators. Only one copy function, for the innermost mutation, needs to be inserted. This is because the successive mutation invocations (non-leaf nodes) will inherit the value of their mutation_safe flag from the incoming node. Since the incoming node has been set to true, i.e. safe, the successive mutator invocations will also be safe.

The second part of the preferred embodiment of this invention is used only for update and trigger statements. For an update in these statements, a process called grouping is carried out. Related update entries are grouped into one group based upon the update target. For example, the following related update entries update three different attributes of column C of a nested ADT. It should be noted that attributes "f1" and "f2" of column C are also ADTS. Column C is of ADT type. ADT "f1" has at least two attributes "f11" and "f12", and ADT "f2" has at least one attribute "f21".

```
e.g., C..f1..f11 = expression1
      C..f1..f12 = expression2
      C..f2..f21 = expression3
```

As discussed above, for the left hand side of the equality, after all update entries are completed, it is desired that all three attributes are mutated according to the right hand side of the equality. That is, a side effect is desired. This is contrary to the first part of the preferred embodiment discussed above which avoided side effects. Therefore, something else has to be done to achieve the desired side effect. Since the attributes are being updated, the purpose of an update is to create the side effect of an updated attribute within the ADT.

The two parts of the algorithm can be analogized as follows. Suppose column C is a car, attribute "f1" is a seat, "f11" is a color of the seat covering, and "f12" is a material of the seat covering. According to the first part of the algorithm, no side effects would be given to the car; there would be the original car with the original seat and seat covering of a certain color and material. In addition, there would be two unattached seats; one having a different colored seat covering, and one having a seat covering with a different material. However, the second half of the algorithm satisfies the desire to have a new seat covering having the new color and new material on the seat as part of the car, and not just as an additional unattached separate seat or seats.

To achieve this, three steps are performed. First, a new copy of the updated column (referred to as a mutated target or common target) is duplicated, and a new built in function is introduced called prog1 to group together all of the side effects. Prog1 takes two arguments as input. The first argument is always used unconditionally as the result of the function. That is, it always returns the first argument as the result. The second argument is used only for obtaining the side effect caused by the mutation.

The second step transforms an update entry of the form:

C..f1. . . fn=expression into a mutation function call:

fn(fn-1( . . . (f1(c)) . . . ), expression)

where C is the mutation target generated by the compiler as described in step one.

The third step merges all of the related mutated functions, as described in step two, together to create an accumulated effect, and rewrites it into terms of prog1. For example, the above update expressions will be merged into the following update entry as follows:

```
C = prog1(prog1(prog1(C,f11(f1(C), expression1)),
              f12(f1(C), expression2)),
              f21(f2(C), expression3));
```

There is now only one update entry as shown above.

In the third prog 1, the innermost prog1, the first argument is C. The innermost prog1 will take C as the first argument. The second argument is a mutation function. It mutates the f11 attribute of the f1 attribute of column C by expression1. A copy is not inserted because the side effect is desired. To reflect this, the mutation_safe flag was set to true according to item 137, FIG. 1B. No matter what it does, the first argument C is returned as the result. The first argument C and the occurrence of C in the second argument are the same one which accomplishes the desired side effect. After prog1 is evaluated, the result is the original C with that attribute mutated. This will become the first argument of the next level prog1. The second argument to the next prog1 is another mutation which corresponds to the second row of update entries above. This continues for all levels of prog1. After all attributes have been mutated, the side effect is an accumulated ADT with all of the attributes mutated. The mutated attributes are assigned to the C column and it is saved to disk.

It should be noted that there are now three kinds of references to columns as previously discussed. The first kind is to the left hand side of the equality. The left hand C is the update target. The other four different C's on the right hand side of the equality are called mutated targets which are generated by the compiler. Therefore, the mutation_safe flag is set to true. If expression1, expression2, and/or expression3 contains references to column C, (e.g., expression3= f11(f1(C))), column C would be referred to as a read target. It should be noted that the read target and the mutated target can not share the same copy. Otherwise, there would be a read/write conflict again within the right hand side of the equality.

Suppose, expression3 contained "f11(f1(c))". Expression3 references and tries to read the f11 attribute to mutate f21 attribute. The new C is different because it is trying to read an original copy of C and trying to figure out the value of the f11 attribute. If the C in expression3 shares a same copy as the other C's on the right hand side of the expression, then, depending upon the order of evaluation there may be a different result. If the mutation of the attribute takes place first, then there will be a different value from the original value. If the read takes place first before the mutation, then one will get the original value which should be the correct value.

When a mutated target is introduced by the compiler (i.e., the four C's on the right hand side of the equality which were not a part of the original syntax), a copy of the column C (on the right hand side of the equality) is made for the mutated target (because the mutated target and read target can not share the same copy), and the mutation flag of the mutated target is set to true. When the parsed tree is processed, the first half of the algorithm will not insert any copy functions for the mutator functions. This is because a side effect has to be accumulated among the C column.

The grouping mechanism will take care of the mutation in a SET clause of an update statement and trigger statement. It will create a mutated target, it will group together all related update entries, and it will set the mutation_safe flag to true so that there will not be any copy function inserted.

In the following UPDATE statement example;

```
UPDATE mediaTblSET
    media = title(rated(description(
        ...
        content(copy(media), :hv),
        ...
        'A story in Africa ...'),
    'PG13'),
    'Lion King');
```

In double-dot notation, the original format before the merge is a list of attributes to be updated:

```
media..title = 'Lion King'
media..rated = 'PG13'
.
.
.
media..content = host variable (hv)
```

For the update statement shown above, after introducing grouping and introducing a mutated target, there will be a single update entry with C on the left hand side and a nested invocation of prog1 functions on the right hand side. The innermost one is to mutate the content. The outer level will mutate the title.

```
prog1(prog,....prog1(media,
                    content (media,
                    .
                    .
                    .
                    rated(media, 'PG13')
                    title(media,'Lion King');
```

There is a sequence of prog1 function calls, one for each attribute being updated. The second attribute of each prog1 function will always be a mutation to achieve the expected result. Since the mutation_safe flag of the intended target is already set to true, none of the mutations will create a new copy if it is written in double-dot notation.

The user may choose to either use double-dot notation to write the update statement, or the user may choose to manually write a nested function call to mutate each attribute of the ADT. If the latter is the case, there will be only one copy inserted. Otherwise, if double-dot notation is used, no copy is inserted into the parse tree. However, the compiler will generate a mutate target (i.e., a copy of the common composite object being updated) for use by successive mutations. For the nested function calls written by a user, since the innermost one is not safe, a copy can be inserted there. Since the successive mutator functions are safe, nothing further is done for the successive mutator functions.

It should be clarified that the compiler knows that there is a mutation if double dot notation is used on the left hand side of the equality. The compiler can figure out the mutation and group the prog1 functions accordingly so that it is always safe and no extra copy needs to be inserted into the parse tree. With functional invocation notation, the compiler can not readily discern what would be safe without first inserting one copy.

Figure 2:
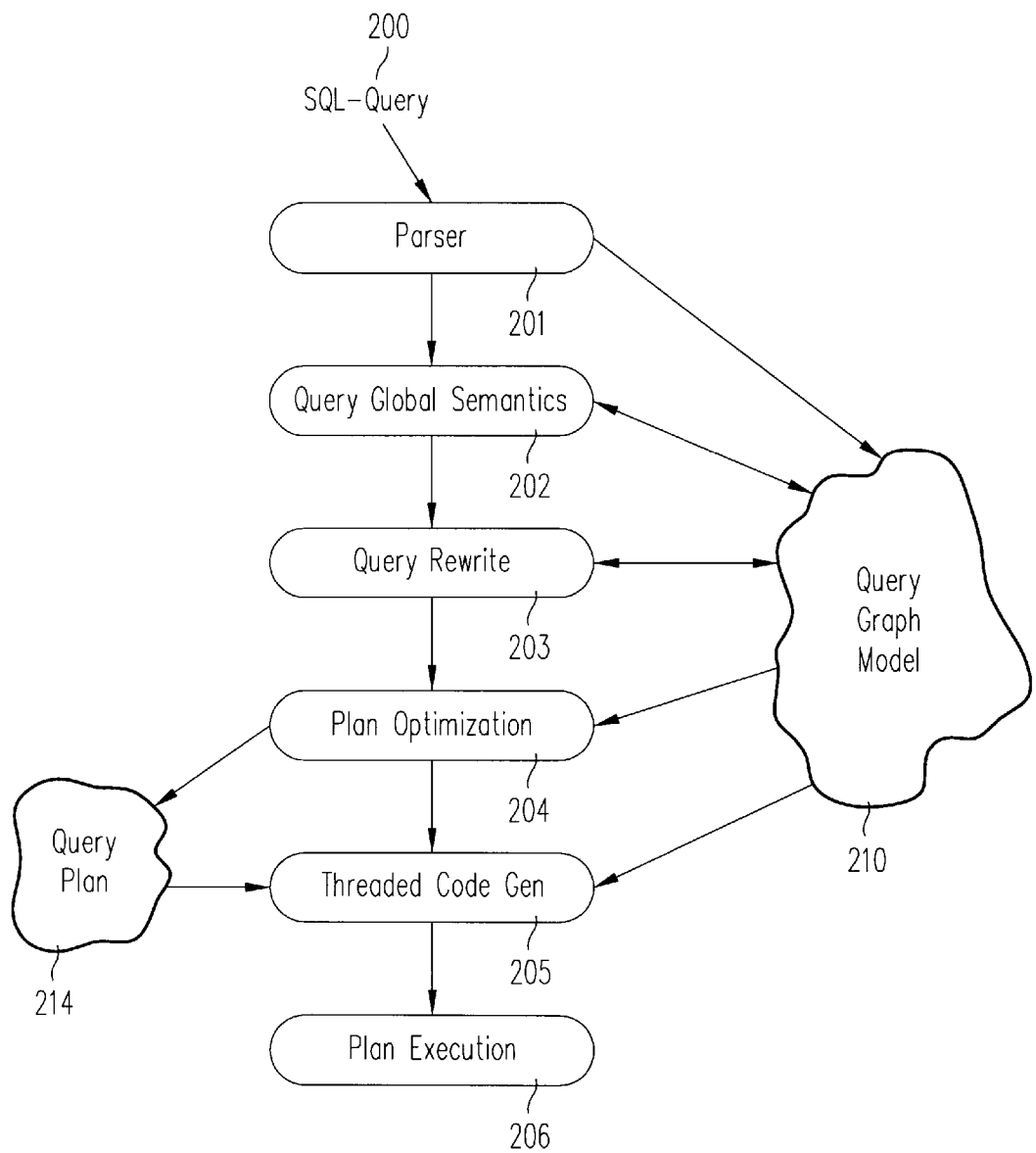
FIG. 2 is a functional block diagram of a database management system for carrying out the method and program steps of each embodiment of the invention.

The above described preferred embodiment will be described with reference to FIGS. 2, 3A, 3B, and 3C. FIG. 2 illustrates an overview of query processing and the functional components of the system which carry out the functions, method steps, and program for all of the embodiments of the invention. The parser 201 reads the incoming SQL query statement 200, and generates an initial Query Graph Model (QGM) 210. The query global semantics 202 checks for semantically necessary changes. The query rewrite 203 tries to change the QGM 210 (that may have been changed by the query global semantics 202) to be more effective. The plan optimization 204 tries to find the best order for evaluating the query. The threaded code generator 205 writes down the final plan in a way it can be later executed. The plan execution 206 executes the plan.

First the parser 201 "reads" the SQL-text. Whenever a function is read it calls a function resolver 211, FIG. 3A, to understand the text that it just read. After the function is resolved (understood), some semantic actions are executed, 212 FIG. 3A, depending on the meaning of the function. When this is done, the parser 201 continues to read the text or call the function resolver 211 with the newly gained "knowledge." Therefore, the parsing goes from left to right, (arrow 221, FIG. 3A), but the understanding (function resolution) and the semantics are done from the bottom up (arrows 222, 223, FIG. 3A).

Figure 3A:
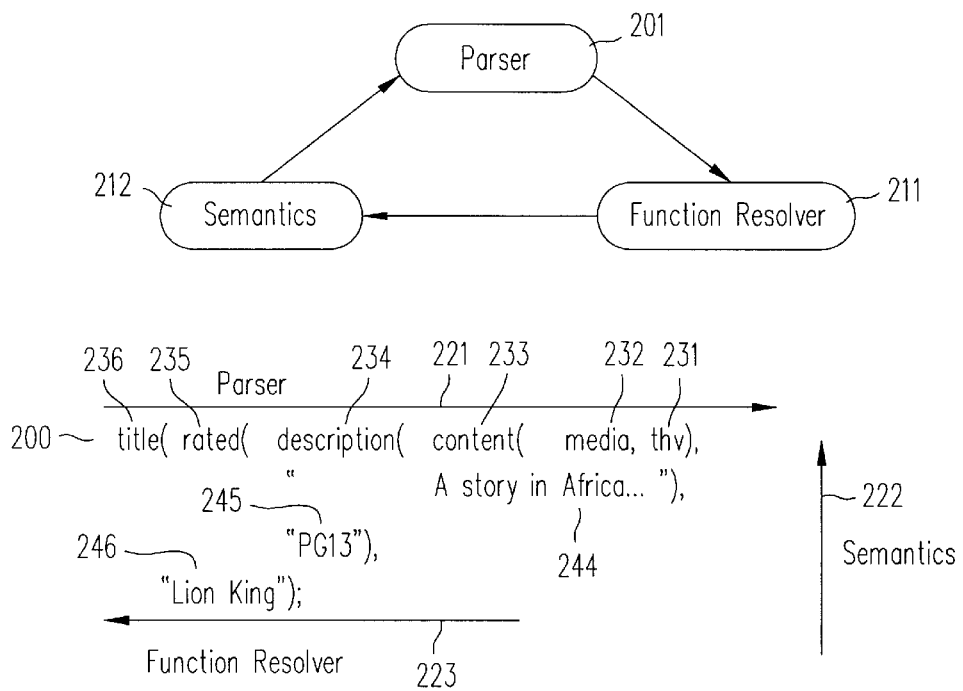
FIG. 3A illustrates how a query expression is parsed.

This means that, as shown in FIG. 3A, "media" 232 and ":hv" 231 are handled first. The function resolution 211 is used on it, and "content()" 233 is now understood. Knowledge of the first argument of description() 234 is then known. The parser 201 reads "A story in Africa" 244, and can now resolve description() 234. This continues until the whole expression 200 is parsed, all functions are resolved, and all semantic actions are taken.

Figure 3B:
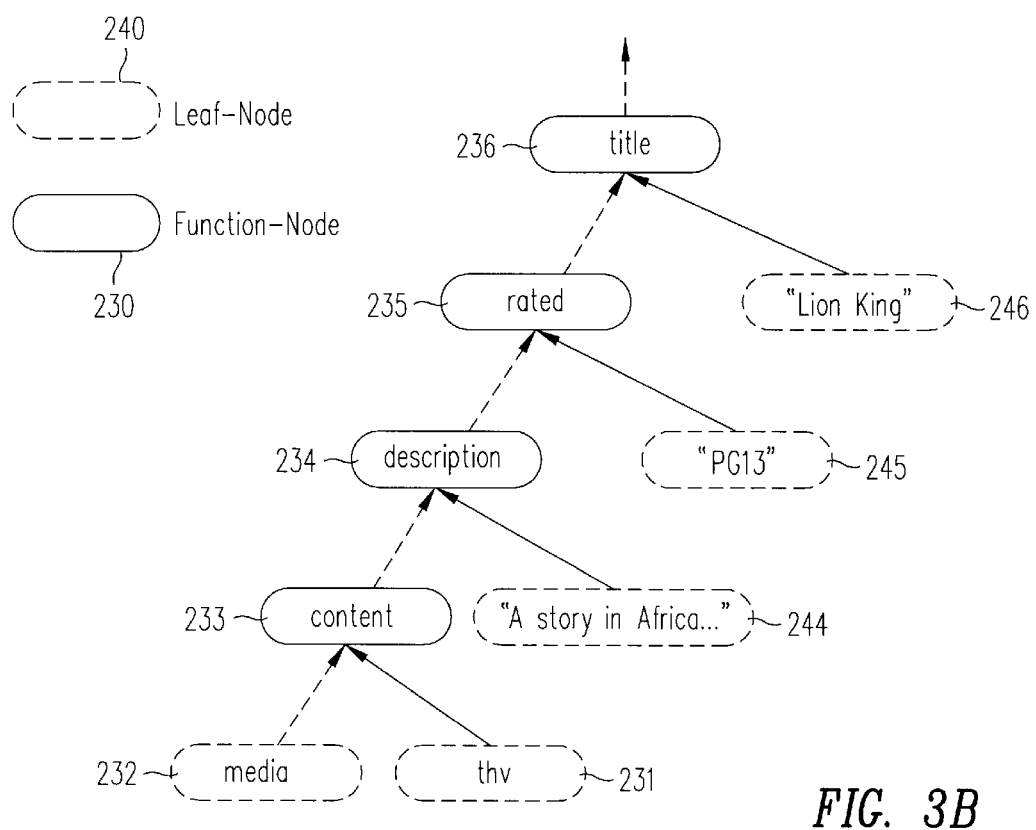
FIG. 3B illustrates leaf and non-leaf nodes, i.e., function nodes, for an expression.

Since the parser 201 can not understand and resolve everything immediately, it has to store the information in proper form that allows further action. This is done in a parse-tree. Every atomic construction (e.g., constants or variable names) is called a leaf-node. Leaf-nodes are understood by the parser immediately. FIG. 3B illustrates the leaf-nodes 240 and the non-leaf-nodes, or function nodes 230.

Figure 3C:
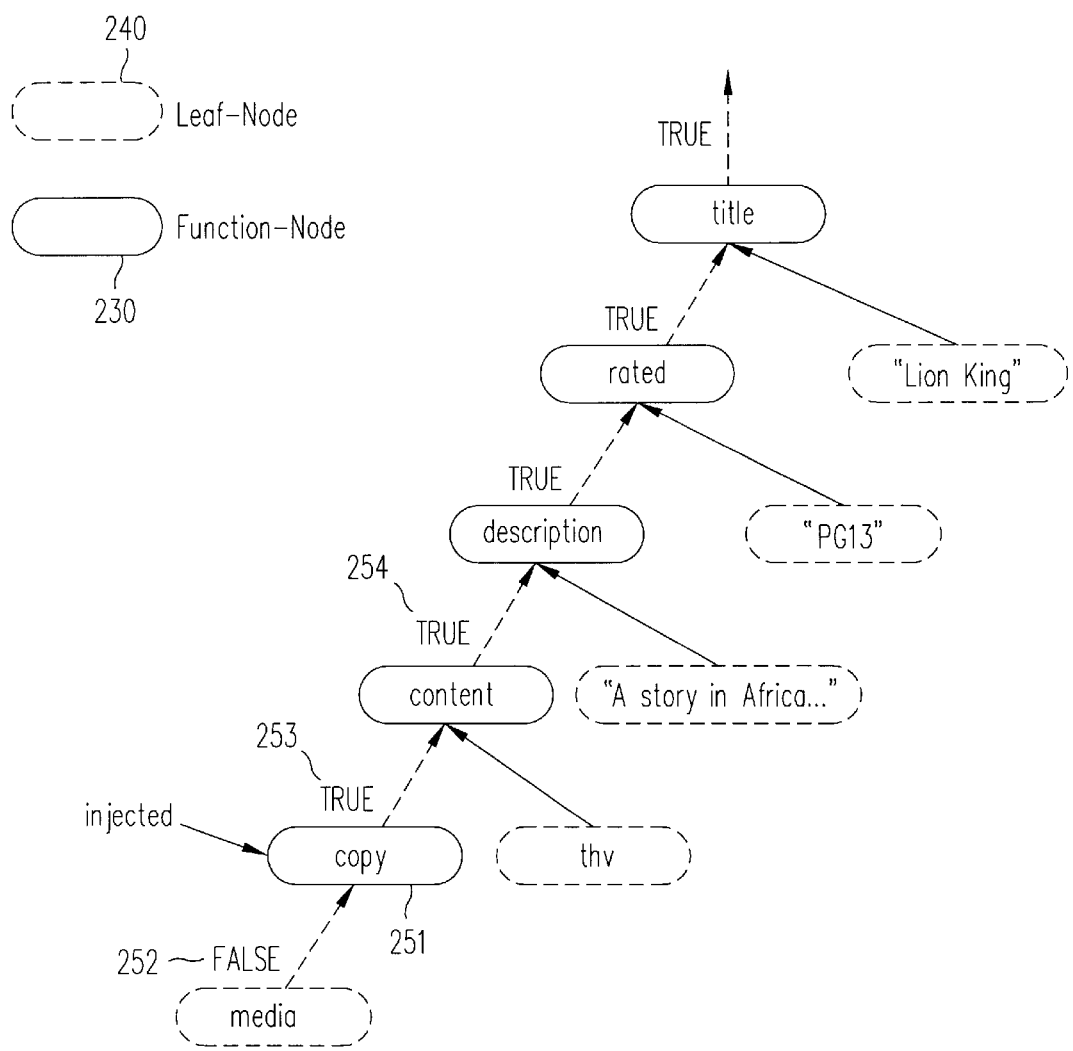
FIG. 3C illustrates the value of the mutation_safe flag for each node of the parse-tree and the insertion of a copy constructor based upon those values.

For the evaluation of the expression 200 as shown in FIG. 3A and FIG. 3B, there only needs to be as many copies as necessary to make sure that the original input (media) is not altered. Therefore, in the semantic phase 212 FIG. 3A, after the function resolution 211, the safety of incoming mutator-functions are noted. This is carried out by applying the following definition of rules as illustrated in FIG. 3C:
For the following non-leaf function nodes:
Constructor void->ADT
  Since a constructor produces a new ADT which can not be used by any other function (because at the time of its creation its existence is not known), the resulting ADT is declared as "mutation-safe" (S:=TRUE) as indicated by a mutation_safe flag having the value TRUE.
Copy-Constructor ADT->ADT
  Since a copy constructor creates a private copy of an existing ADT, its result is declared safe (S:=TRUE)
Observer ADT->attribute-value
  An observer is defined as neutral and returns the same state that it received as input.
Mutator ADT, attribute-value->ADT
  A mutator is always forced to being safe (S:=TRUE) by the following:
  If a mutation flag was unsafe (=False), 252, FIG. 3C, for the incoming ADT, a copy constructor 251 is forced into the expression. The copy constructor's result is used as the new argument. The copy constructor will turn the flag to S:=TRUE, 253. The mutator then returns the flag S:=TRUE, 254, also. It should be noted, that for the evaluation of the expression as illustrated in FIG. 3C, it was only necessary to add one copy-constructor, which is the minimum possible for this query.
For leaf-nodes (e.g., ADT columns)
For queries, the process begins with the mutation_safe flag being false (S:=FALSE), 252 FIG. 3C. This is because several expressions may reference the same column.
For updates, the following functions and steps are implemented.

It should be noted that updates are used to change data on disk. If the following expressions are written:
UPDATE mediaTbl SET C..rated='PG13' WHERE C..title='Lion King'
it is desired that the column 'C' in mediaTbl is changed persistently. (This is similar to changing a document and then saving it under the same filename).

Columns on the left-hand side of an '=' sign are referred to as update-targets. While changing this column (in memory), it is referred to as a "mutated-target". When the previous, original value of this column is accessed, it is referred to as a "read-target". It is necessary to be able base an evaluation of every point in the SET clause on the original value of the column. (As an analogy, a file that is kept for reference when a document is being changed would be a "read-target;" the document in a window being edited would be a "mutated-target"; and the file where it is being written to is the "update-target").

By using the read target as a backup, additional copies can be suppressed by using the following algorithm:

```
For example:
SET   C..f1..f11 = expr₁(C)
is parsed as:
C_u = prog1(C_m,f11(f1(C_m),expr1(C_r)))
Also,
SET   C..f1..f11 = expr₁(C)
      C..f1..f12 = expr₂(C)
is parsed as:
C_u = prog1(    prog1(C_m,f11(f1(C_m),expr1(C_r)))
                f12(f1(C_m),expr2(C_r)))
Where:   C_u = update-target
         C_m = mutated-target
         C_r = read-target
```

If the SET statement is done on several columns, they are grouped independently. The only difference is that the expressions could depend on several read-targets.

Figure 4:
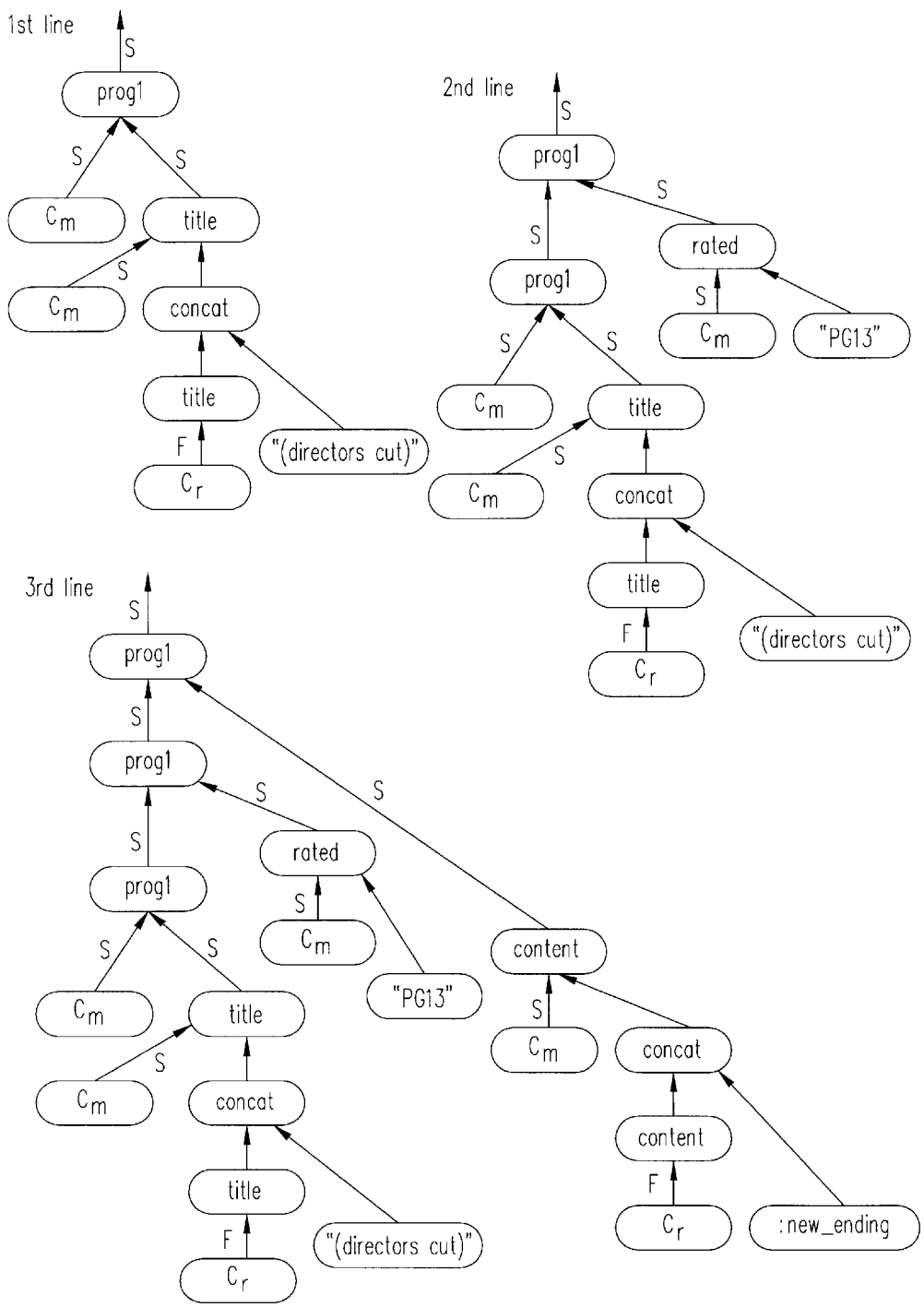
FIG. 4 illustrates the value of the mutation_safe flag for each target, by applying the rules for determining the values, for the three lines of a SET statement as follows.

It should be noted that the evaluation of the parsed expression follows the rules for setting the mutation_safe flag and for inserting copy constructors as described above. The following additional rules are used:
  A leaf-node "read-target" results to S:=False (not mutation safe)
  A leaf-node "mutated-target" results to S:=TRUE (It is mutation safe because side effects are wanted, i.e., an accumulation of updates for a same update target is desired.)
  The function prog1(x,y) is a system generated function that always returns x and S:=TRUE FIG. 4 illustrates the value of the mutation_safe flag for each target by applying the rules for the three lines of the following SET statement:

```
SET  C..title     = C..title || '(directors cut)'
     C..rated     = 'PG13',
     C..content   = C..content || :new_ending;
```

The advantages of the above-described preferred embodiment is discussed as follows. First, the algorithm is easy to implement with minimal coding effort because it is local and syntax directed. Second, the algorithm can be implemented in a single pass as the parse tree is normally processed. The mutate_safe flag can be propagated on the fly, i.e., during processing of the parse tree, since no global information is needed. Other embodiments requiring global analysis would probably require multiple passes. For the preferred embodiment, no extra pass to the compiler is needed. A third advantage is that a minimal number of copy constructors are inserted for most practical scenarios. A fourth advantage is that it provides a solution to the problem at hand, i.e., a side effect is achieved in an update without having a mutation anomaly. This is achieved with minimal cost and minimal complexity.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hardwired/cabled communication network, cellular communication, radio wave communication, satellite communication, and other stationary or mobile network systems/communication links.

A machine embodying the invention may involve one or more processing systems including, but not limited to, cpu, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

We claim:

1. A method for mutating, in response to a query language statement, a composite object in a database, the method comprising:

creating a copy of the composite object before the composite object is to be mutated; and using the copy by a mutator function in the query language statement.

2. The method of claim 1 wherein the copy of the composite object is made for an innermost mutation if a compile time analysis indicates a write/write or read/write conflict.

3. The method of claim 1 further comprising the step of indicating a mutation safe status for each parse tree node of the query language statement wherein the copy created for the composite object is determined according to the mutation safe status.

4. A method for mutating, in response to a query language statement, a composite object in a database managed by a database management system, the method comprising:

inserting a copy constructor in a parsed representation of the query language statement to create a copy of the composite object when the composite object is being mutated;

using the copy by a mutator function in the query language statement; and using an original of the composite object for other functions in the query language statement.

5. The method of claim 1 wherein a separate copy is created for every occurrence that any composite object is being mutated.

6. A method of mutating, in response to a query language statement, a composite object in a database managed by a database management system, the method comprising:

performing a compile time analysis to determine if a write/write or read/write conflict exists; and inserting a minimum number of copy constructors, if the conflict exists, in order to avoid the conflict.

7. The method of claim 6 wherein the step of performing a compile time analysis further comprises:

accumulating information, for each expression of the query language statement, as to a presence of composite objects, what operations are being performed on each composite object and with respect to which attributes, and whether the operations appear in a same or different expression of the query language statement.

8. A method of mutating, in response to a query language statement, a composite object in a database managed by a database management system, the method comprising:

performing a compile time analysis for determining if an observer function is present; and inserting a copy constructor for an innermost mutation if the observer function is present.

9. A method of mutating, in response to a query language statement, a composite object in a database managed by a database management system, the method comprising:

setting a mutation safe status for each parse tree node of the query language statement according to the following:

a) for each leaf node corresponding to a composite object, setting the mutation safe status to indicate that the node is not safe;

b) for each non-leaf node, deriving the mutation safe status from an incoming node and from the function itself; and inserting a copy constructor for a mutated composite object, if the mutation safe status is not safe, and setting the mutation safe status to true for a mutator node of the mutated composite object.

10. A method of processing a SET statement, the method comprising:

grouping together update entries based upon a same target being updated;

generating, by a compiler, a copy of a composite object which is the same target being updated; and using the generated copy as a common target for mutations caused by the update entries of a same group.

11. The method of claim 10 wherein the step for using further comprises setting a mutation safe indicator associated with the common target to true to avoid a copy function being inserted for subsequent mutations.

12. The method of claim 10 wherein the copy is generated according to the following steps:

a) setting a mutation safe indicator for each parse tree node of the SET statement as follows:
  i) for each leaf parse tree node:
    1) each read target defaulted to false;
    2) each mutated target defaulted to false;
  ii) for each non-leaf parse tree node:
    1) constructors always true;
    2) copy constructors always true;

3) observers inherit from the parse tree node of an observed composite object;

b) wherein the generated copy is generated for a mutated composite object if the mutation safe indicator of the mutated composite object indicated not safe; and c) setting the mutation safe indicator of the mutator node of the generated copy to safe;

thereby accumulating a plurality of mutated attributes in a same copy of a composite object.

13. The method of claim 10 further comprising generating, for the update entries grouped together, a sequence of nested function invocations, a function invocation for each attribute being updated, wherein a first argument of the function is returned as a result and a second argument of the function obtains an effect caused by a mutation.

14. A method for processing a SET statement, the method comprising:

generating, by a query compiler, a copy (a mutation target) of a common composite object being updated in the statement;

transforming an update entry of the form $$C..f_1...f_n = \text{expression}$$

into a mutation function call $$f_n(f_{n-1}(...(f_1(C))...), \text{expression})$$

where C is the mutation target generated by the compiler; and merging all of the mutation function calls for all related update entries together into a nested sequence function invocation, wherein a first argument of the function is returned as a result and a second argument of the function obtains an effect caused by a mutation, to create an accumulated effect for the mutations in the copy of the common composite object.

15. A method for processing a SET statement, the method comprising:

generating, by a query compiler, a copy (a mutation target) of a common composite object being updated in the statement;

grouping together update entries in a sequence of nested function invocations, a function invocation for each attribute being updated, wherein a first argument of the function is returned as a result and a second argument of the function obtains an effect caused by a mutation; and setting an indicator associated with a parse tree node of the mutation target to indicate that mutation is safe thereby avoiding a copy function being inserted and creating an accumulated effect for the mutations in the copy of the common composite object.

16. A system for handling a mutation of a composite object in a database, the system comprising:

means for generating a copy of the composite object before the composite object is to be mutated; and means for using the copy by a mutator function in a query language statement.

17. The system of claim 16 wherein a separate copy is generated for every occurrence that any composite object is being mutated.

18. The system of claim 16 further comprising a mutation safe status indicator for each parse tree node of the query language statement wherein the copy created for the composite object is determined according to the mutation safe status.

19. A system for handling a mutation of a composite object in a database managed by a database management system, the system comprising:

means for inserting a copy constructor in a parsed representation of a query language statement to create a copy of the composite object when the composite object is being mutated;

means for using the copy by a mutator function in the query language statement; and means for using an original of the composite object for other functions, if any, in the query language statement.

20. A system for handling a mutation of a composite object in a database managed by a database management system, the system comprising:

a query compiler having means for performing a compile-time analysis to determine if a write/write or read/write conflict exists; and means for inserting a minimum number of copy constructors, if the conflict exists, in order to avoid the conflict.

21. The system of claim 20 wherein the query compiler further comprises means for accumulating information, for each expression of a query language statement, as to a presence of composite objects, what operations are being performed on each composite object and with respect to which attributes, and whether the operations appear in a same or different expression of the query language statement.

22. A system for handling a mutation of a composite object in a database managed by a database management system, the system comprising:

a query parser having means for setting a mutation safe status for each parse tree node of the query language statement according to the following:

a) for each leaf node corresponding to a composite object, setting the mutation safe status to indicate that the node is not safe;

b) for each non-leaf node, deriving the mutation safe status from an incoming node and from the function itself; and means for inserting a copy constructor for a mutated composite object, if the mutation safe status is not safe, and means for resetting the mutation safe status to true for a mutator node of the mutated composite object.

23. A database management system having means for processing a SET statement, the system comprising:

means for grouping together update entries based upon a same target being updated;

a compiler for generating a copy of a composite object which is the same target being updated; and means for using the generated copy as a common target for mutations caused by the update entries of a same group; and means for setting a mutation safe indicator associated with the common target to true to avoid a copy function being inserted for subsequent mutations.

24. The system of claim 23 further comprising means for generating, for the update entries grouped together, a sequence of nested function invocations, a function invocation for each attribute being updated, wherein a first argument of the function is returned as a result and a second argument of the function obtains an effect caused by a mutation.

25. A program, having computer readable program code means on a computer usable medium, having means for handling a mutation of a composite object in a database, the program comprising:

means for causing a generation of a separate copy of each composite object before each time each composite object is to be mutated; and means for causing a use of the separate copy by a mutator function in a query language statement.

26. A program, having computer readable program code means on a computer usable medium, having means for handling a mutation of a composite object in a database, the program comprising:

means for causing an insertion of a copy constructor in a parsed representation of a query language statement to create a copy of the composite object when the composite object is being mutated;

means for causing a use of the copy by a mutator function in the query language statement; and means for causing a use of an original of the composite object for other functions in the query language statement.

27. A program, having computer readable program code means on a computer usable medium, having means for handling a mutation of a composite object in a database, the program comprising:

means for carrying out a compile time analysis to determine if a write/write or read/write conflict exists; and means for causing an insertion of a minimum number of copy constructors, if the conflict exists, in order to avoid the conflict.

28. A program, having computer readable program code means on a computer usable medium, having means for handling a mutation of a composite object in a database, the program comprising:

means for causing a generation of a copy of the composite object before the composite object is to be mutated;

means for causing a setting of a mutation safe status, during parsing, for each parse tree node of a query language statement wherein a determination as to where to insert the generated copy in a parsing of the query language statement is determined according to the mutation safe status; and means for causing a use of the copy by a mutator function in the query language statement.

29. A program, having computer readable program code means on a computer usable medium, having means for handling a mutation of a composite object in a database, the program comprising:

means for causing a setting of a mutation safe status for each parse tree node of a query language statement according to the following:

a) for each leaf node corresponding to a composite object, setting the mutation safe status to indicate that the node is not safe;

b) for each non-leaf node, deriving the mutation safe status from an incoming node except that constructors and copy constructors are always safe; and means for causing an insertion of a copy constructor for a mutated composite object, if the mutation safe status is not safe, and causing a setting of the mutation safe status to true for a mutator node of the mutated composite object.

30. A program, having computer readable program code means on a computer usable medium, having means for processing a SET statement, the program comprising:

means for causing a generation of a copy (a mutation target) of a common composite object being updated in the statement;

means for transforming an update entry of the form $$C..f_1. . . f_n=\text{expression}$$

into a mutation function call $$f_n(f_{n-1}( . . . (f_1(C)) . . . ), \text{expression})$$

where C is the mutation target generated by the compiler; and means for merging all of the mutation function calls for all related update entries together into a nested sequence function invocation, wherein a first argument of the function is returned as a result and a second argument of the function obtains an effect caused by a mutation, to create an accumulated effect for the mutations in the copy of the common composite object.

31. A program, having computer readable program code means on a computer usable medium, having means for processing a SET statement, the program comprising:

means for causing a generation of a copy (a mutation target) of a common composite object being updated in the statement;

means for causing a grouping together of update entries in a sequence of nested function invocations, a function invocation for each attribute being updated, wherein a first argument of the function is returned as a result and a second argument of the function obtains an effect caused by a mutation; and means for causing a setting of an indicator associated with a parse tree node of the mutation target to indicate that mutation is safe thereby avoiding a copy function being inserted and creating an accumulated effect for the mutations in the copy of the common composite object.

* * * * *